United States Patent
Mironov et al.

(10) Patent No.: US 12,028,737 B2
(45) Date of Patent: Jul. 2, 2024

(54) METHOD AND APPARATUS FOR REDUCING LATENCY AND COLLISIONS IN A VIRTUAL REALITY/ALTERNATE REALITY SYSTEM

(71) Applicant: ATI Technologies ULC, Markham (CA)

(72) Inventors: Mikhail Mironov, Markham (CA); Gennadiy Kolesnik, Markham (CA); Pavel Siniavine, Markham (CA)

(73) Assignee: ATI Technologies ULC, Markham (CA)

( * ) Notice: Subject to any disclaimer, the term of this patent is extended or adjusted under 35 U.S.C. 154(b) by 920 days.

(21) Appl. No.: 17/031,191

(22) Filed: Sep. 24, 2020

(65) Prior Publication Data
US 2022/0095149 A1    Mar. 24, 2022

(51) Int. Cl.
*H04W 28/02* (2009.01)
*G06T 9/00* (2006.01)
*H04L 67/131* (2022.01)
*H04W 28/06* (2009.01)

(52) U.S. Cl.
CPC ........... *H04W 28/0215* (2013.01); *G06T 9/00* (2013.01); *H04L 67/131* (2022.05); *H04W 28/06* (2013.01)

(58) Field of Classification Search
CPC .............................. H04W 28/0215; G06T 9/00
See application file for complete search history.

(56) References Cited

U.S. PATENT DOCUMENTS

2020/0258306 A1\* 8/2020 Forutanpour ............. G06T 9/00
2021/0127295 A1\* 4/2021 Jo ......................... H04W 80/08

\* cited by examiner

*Primary Examiner* — Jerry T Jean Baptiste
(74) *Attorney, Agent, or Firm* — Volpe Koenig

(57) ABSTRACT

A method and apparatus for reducing latency in a virtual reality system including a plurality of devices comprises capturing and transmitting, by a first device, a first batch of data to a second device. The second device renders and encodes a second data based upon the first batch of data, and transmits the first encoded image to the first device. Based upon a determination of a likelihood of collision between a transmission of a second batch of data from the first device and the transmission of the second data, the first device adjusts a frequency of capturing and transmitting the second batch of data.

20 Claims, 10 Drawing Sheets

METHOD AND APPARATUS FOR REDUCING LATENCY AND COLLISIONS IN A VIRTUAL REALITY/ALTERNATE REALITY SYSTEM

BACKGROUND

Wireless virtual reality/alternate reality (VR/AR) systems often include a device such as a personal computer (PC) running a VR/AR application, a wireless network and a mobile client device such as a headset or a cell phone running a mobile operating system (OS) that are capable of providing VR/AR experiences. A PC-based application renders a frame, then video encodes it using a video encoder, and sends the compressed data to the client device over the network. Standard video codecs (e.g., H.264 and HEVC) are commonly used to encode frames.

A client application on the mobile device receives the compressed data, uses the on-device decoder to decode the received frame, and finally feeds the decoded frame into the VR presentation application processing interface (API).

Encoding, decoding and transmission over a network increase latency of a VR system and also run the risk of causing collisions between transmissions from and to the devices. Special measures such as, for example, asynchronous time warp are used to hide or reduce latency.

BRIEF DESCRIPTION OF THE DRAWINGS

A more detailed understanding can be had from the following description, given by way of example in conjunction with the accompanying drawings wherein.

DETAILED DESCRIPTION

Although the method and apparatus will be expanded upon in further detail below, briefly a method for reducing collisions in communication between devices is described herein.

A method for reducing latency in a virtual reality system including a plurality of devices comprises capturing and transmitting, by a first device, a first batch of data to a second device. The second device renders and encodes a second data based upon the first batch of data, and transmits the second data to the first device. Based upon a determination of a collision between a transmission of a second batch of data from the first device and the transmission of the second data, the first device adjusts a frequency of capturing and transmitting a second batch of data.

A system for reducing latency in a virtual reality system includes a wireless headset and a second device in wireless communication with the wireless headset. The wireless headset is configured to capture and transmit a first batch of data to the second device, receive a second data from the second device based upon the first batch of data, rendered and encoded by the second device, and based upon a determination of a collision between a transmission of a second batch of data from the wireless headset and the transmission of the second data by the second device, adjusting, by the wireless headset, a frequency of capturing and transmitting a second batch of data.

A non-transitory computer-readable medium for reducing latency in a virtual reality system including a plurality of devices, the non-transitory computer-readable medium having instructions recorded thereon, that when executed by the processor, cause the processor to perform operations. The operations include capturing and transmitting, by a first device, a first batch of data to a second device. The second device renders and encodes a second data based upon the first batch of data, and transmits the second data to the first device. Based upon a determination of a collision between a transmission of a second batch of data from the first device and the transmission of the second data, the first device adjusts a frequency of capturing and transmitting a second batch of data.

Figure 1:
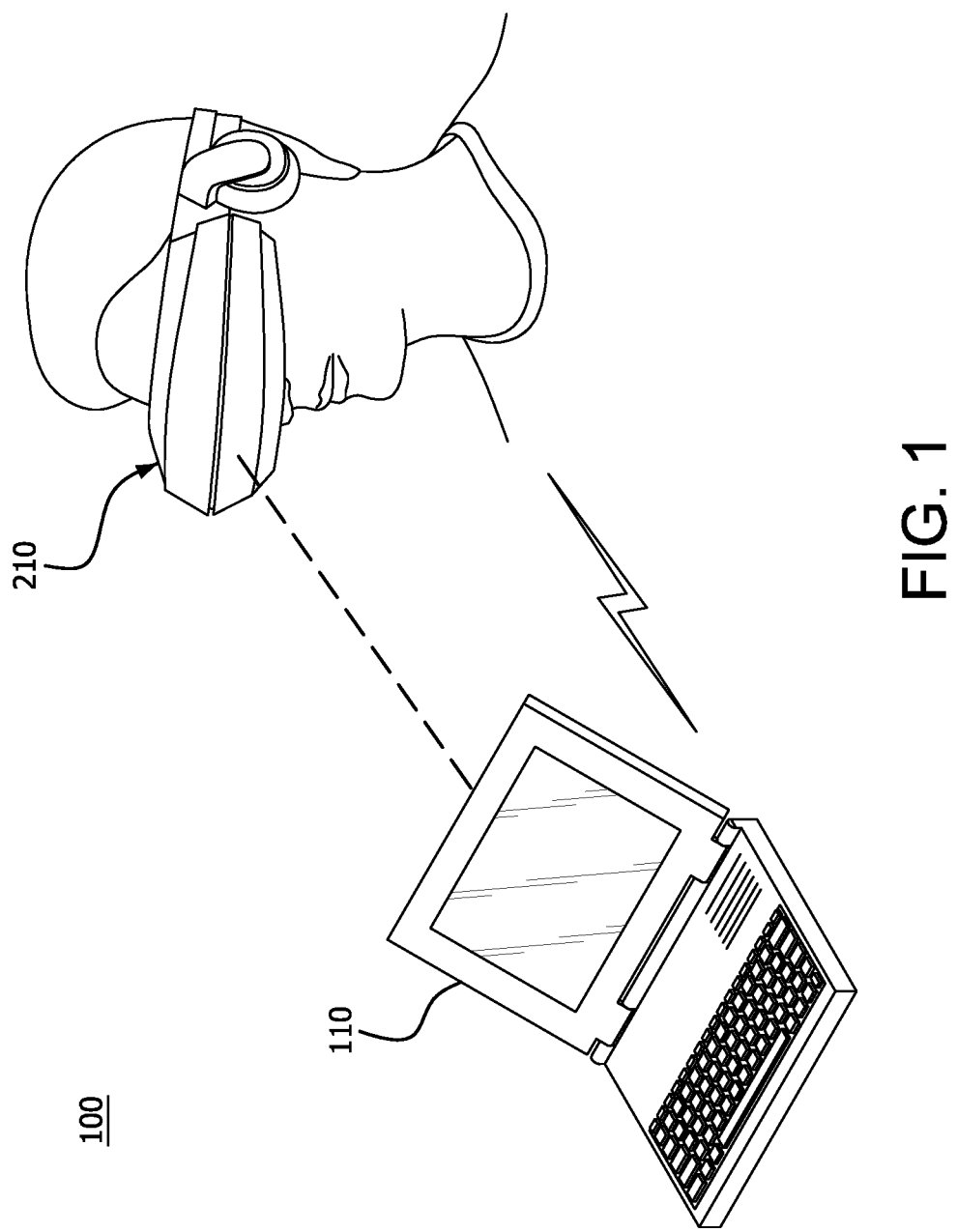
FIG. 1 is a block diagram of an example virtual reality (VR) system.

FIG. 1 is a block diagram of an example virtual reality (VR) system 100. The system includes a computing device or system 110 which may be, for example, a computer, a gaming device, a handheld device, a set-top box, a television, a mobile phone, or a tablet computer. For purposes of example, the computing device 110 is described as a personal computer (PC) herein. The system 100 also includes a VR headset 210 in communication with the PC 110 as will be described in further detail below. The communication can be wired or wireless, as depicted.

Figure 2:
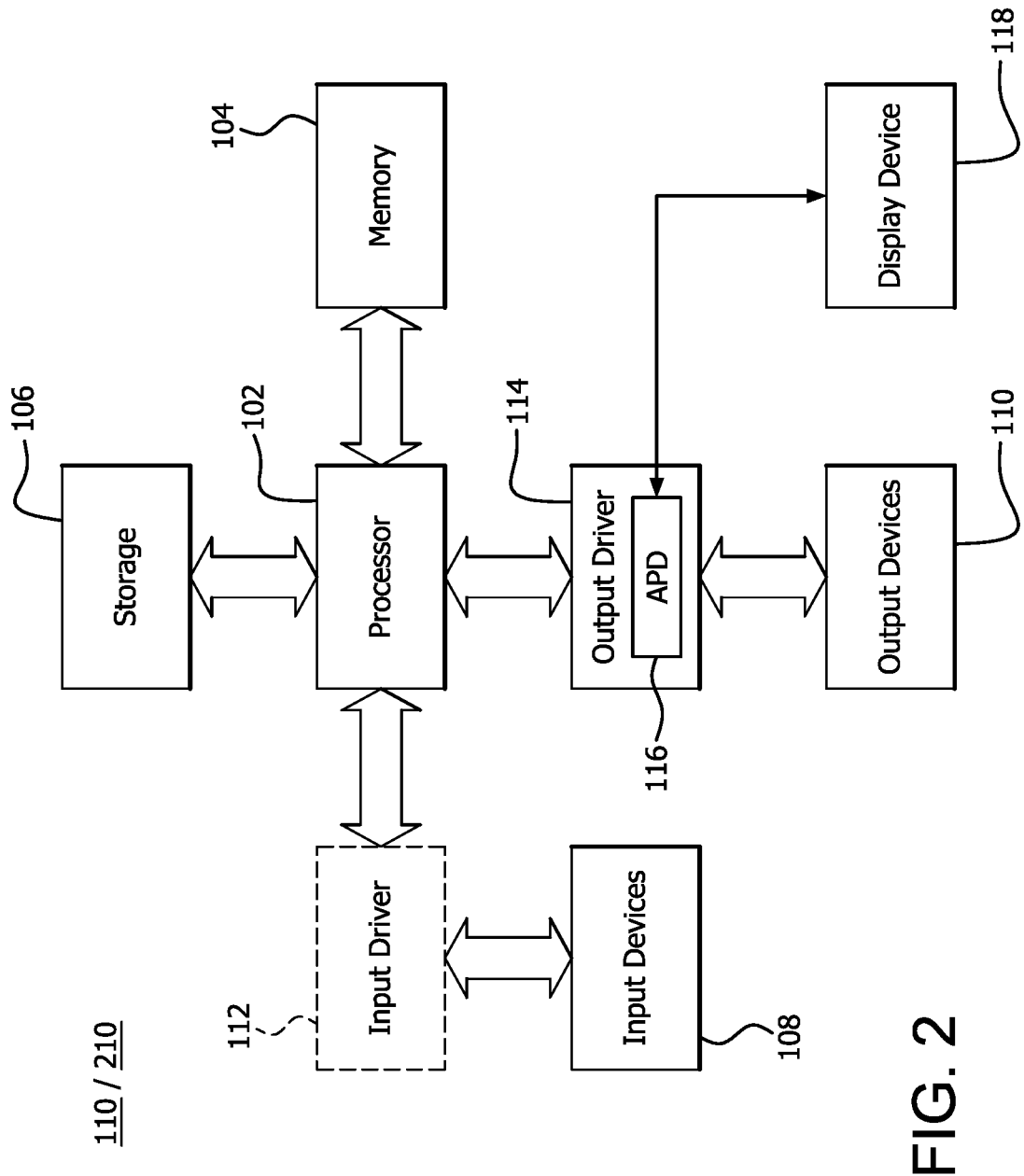
FIG. 2 is a block diagram of one of the example devices 110/210 depicted in FIG. 1 in which one or more features of the disclosure can be implemented.

FIG. 2 is a block diagram of one of the example devices 110/210 depicted in FIG. 1 in which one or more features of the disclosure can be implemented. More detail regarding the implementation of a method of reducing collisions as it relates to FIG. 2 is described in further detail below.

Accordingly, the devices 110/210 include a processor 102, a memory 104, a storage 106, one or more input devices 108, and one or more output devices 119. The devices 110/210 can also optionally include an input driver 112 and an output driver 114. It is understood that the devices 110/210 can include additional components not shown in FIG. 2.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 119 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 the input devices 108, and the lens 111, and permits the processor 102 to receive input from the input devices 108 and the lens 111. The output driver 114 communicates with the processor 102 and the output devices 119, and permits the processor 102 to send output to the output devices 119. It is noted that the input driver 112 and the output driver 114 are optional components, and that the device 110 will operate in the same manner if the input driver 112 and the output driver 114 are not present. The output driver 114 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 3:
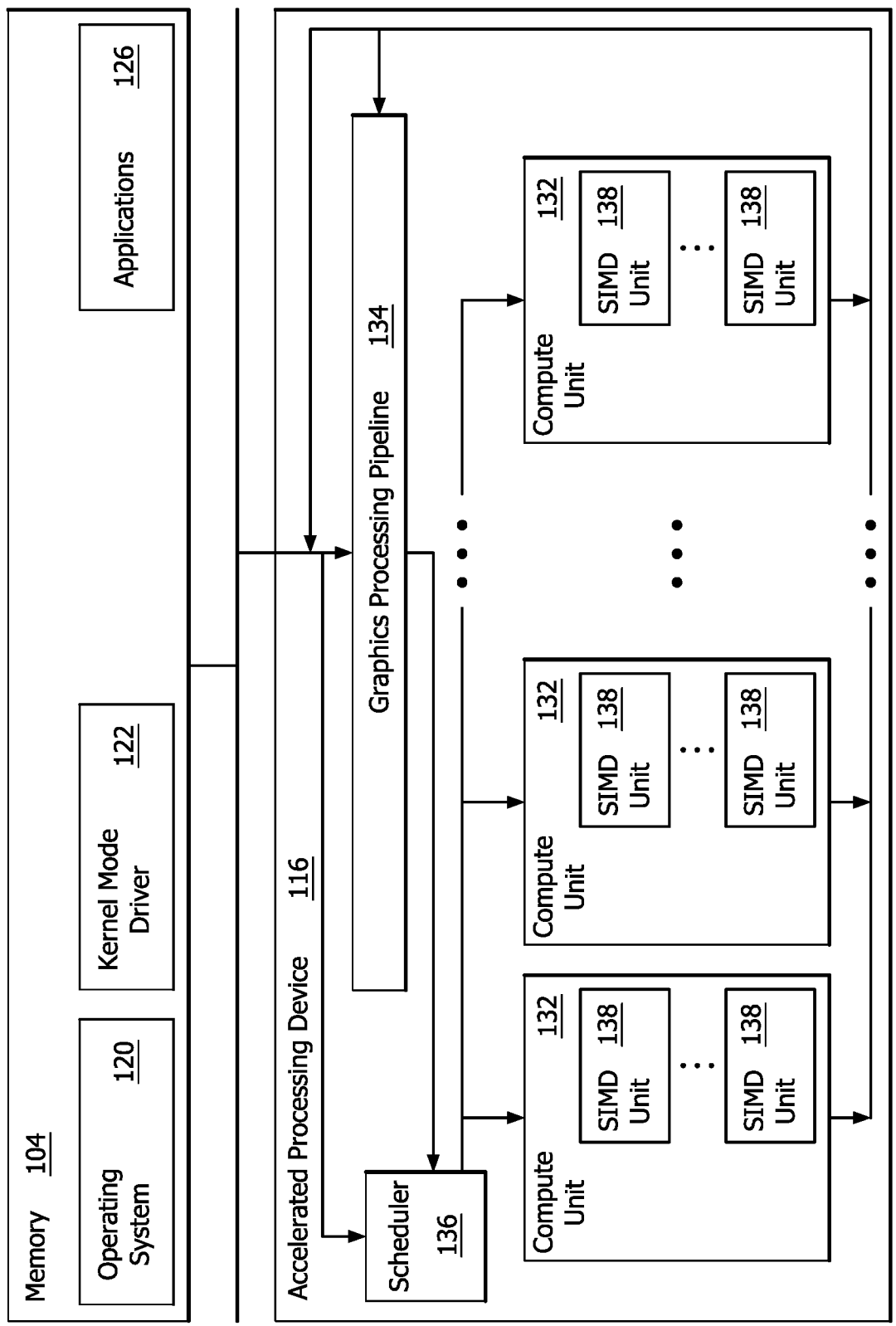
FIG. 3 is a block diagram of the example system of FIG. 2, illustrating additional detail.

FIG. 3 is a block diagram of the devices 110/210, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

As mentioned previously, the PC 110 and the headset 210 are in communication with one another. For purposes of example, the communication is via a wireless connection, but it is understood that the connection could be wired.

Latency is introduced into the system 100 and is defined as time between when a user of the headset 210 moves his head and when he sees the results of the move reflected, a lag which is difficult to completely remove and could cause sickness. In a wireless system the PC 110 renders the video from data received from sensors in the headset 210 over a network. That is, a position is taken at a moment and transmitted over the network which takes time. Additionally, the amount of time is not constant due to network interference, for example. The PC 110 renders, encodes and transmits the data back, taking additional time. Once the headset 210 decodes the video/image, it displays it for the user to see.

One way of addressing latency is to use timewarp, where an offset of the image is used when it is received to account for the time it took to receive it. That is, the image rendered is shifted for an older orientation of the headset by the amount the headset has moved since the moment the pose used for rendering was captured to the moment the image rendered with this pose is presented.

Figure 4:
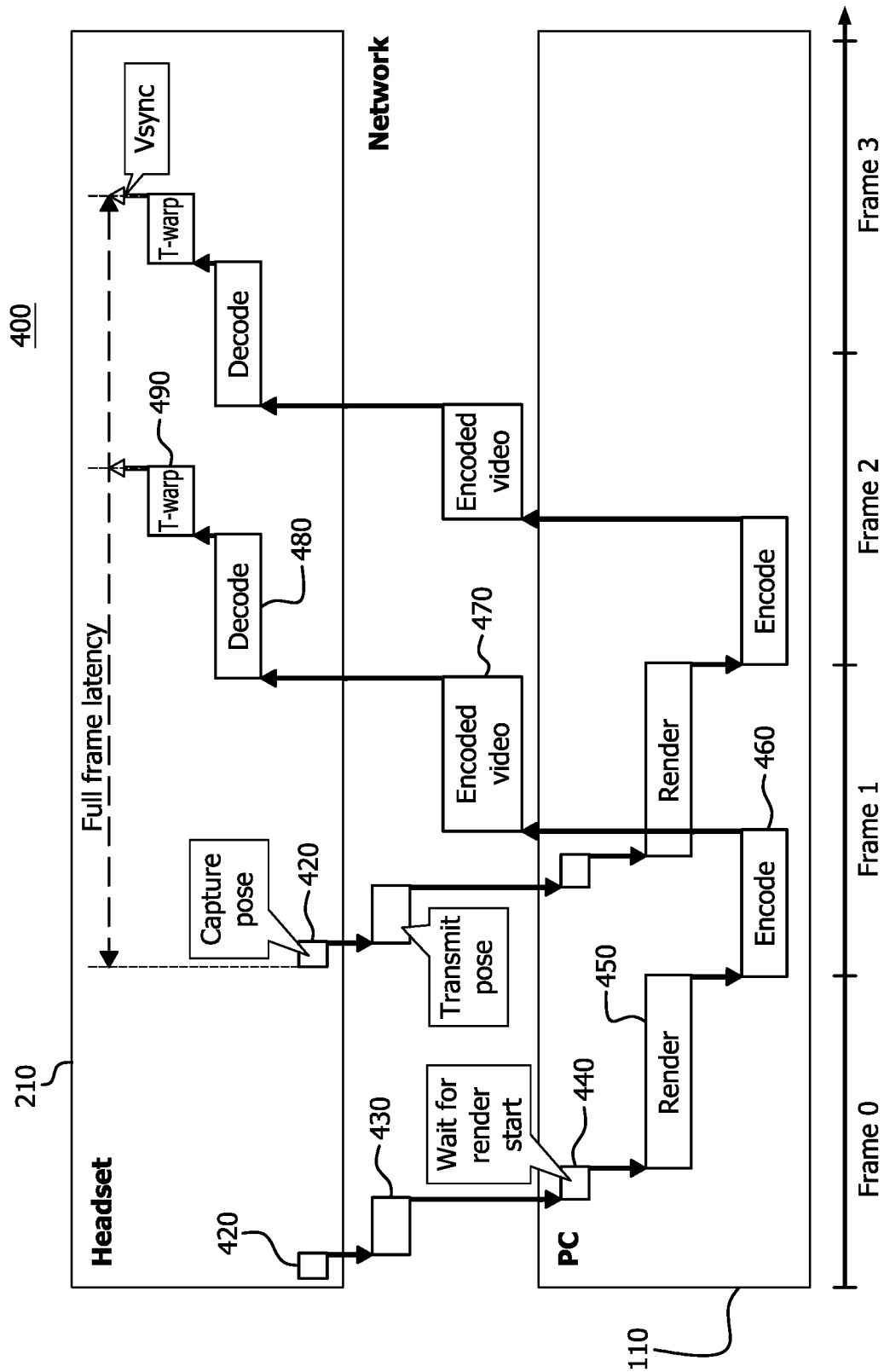
FIG. 4 is an example signaling diagram between a headset and a personal computer (PC) showing a latency example.

In general, overall latency of a VR system can be defined as the time from the moment a head pose is captured to the moment when a frame reflecting this head pose is presented. FIG. 4 is an example signaling diagram 400 between a headset 210 and a PC 110 showing a latency example. The timing and steps performed sequentially involving rendering a single frame are described following. Each step of the process takes a finite amount of time which depends on the underlying hardware or network which is not easily changed. As shown in FIG. 4, a pose is captured (420) by the headset 410 for each of a plurality of frames (Frame 0, Frame 1, Frame 2, Frame 3, . . . ). In 430, the pose is transmitted to the PC 110, which waits to commence rendering (440). The PC 110 performs rendering of the frame (450) and encodes for transmission (460) to the headset 210. The encoded video is transmitted (470) and received by the headset 210, which decodes (480) and perform timewarp (T-warp) 490 in order to compensate for the full frame latency and lens distortion compensation. The frame can then be presented to the user in his display in the headset 210.

Figure 5:
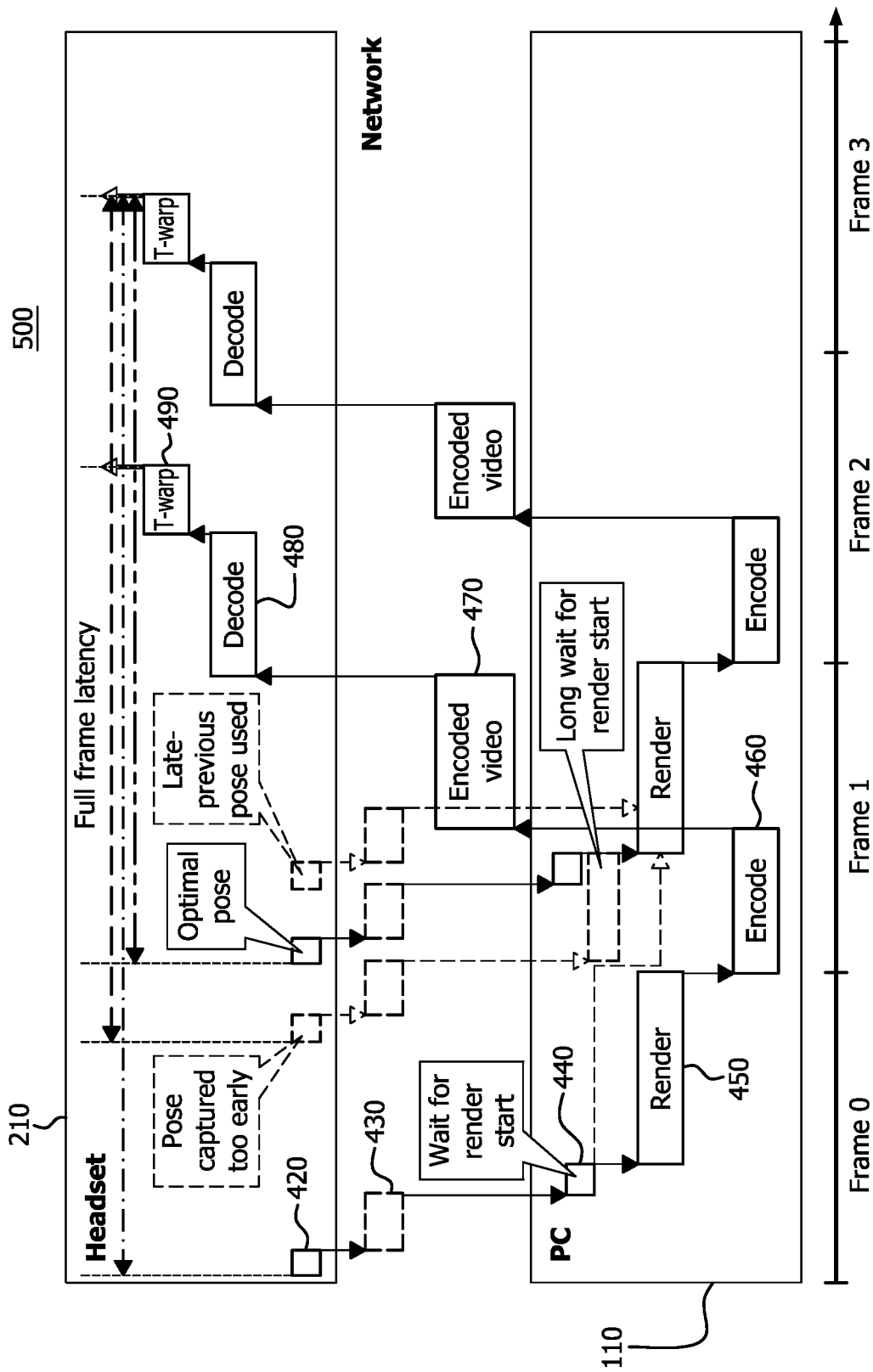
FIG. 5 is an example signaling diagram between a headset and a PC showing latency due to unsynchronized time domains.

Latency is also introduced due to unsynchronized time domains FIG. 5 is an example signaling diagram 500 between a headset and a PC showing latency due to unsynchronized time domains. The head pose is queried on the headset 210 while rendering occurs on the PC 110. Since both of these devices are separate utilizing two different clocks, their time domains are unsynchronized. Even when querying the head pose and rendering occur at the same frequencies, their offset relative to each other when placed on the same timeline creates additional latency. The reference numerals shown in FIG. 5 correspond generally to the reference numerals in FIG. 4.

As can be seen in FIG. 5, the overall latency is increased if a head pose is queried early, and although querying the head pose later decreases the latency, it increases the risk of missing the beginning of rendering. This would cause the previous head pose to be used for rendering instead of the most recent one and increase the overall latency even further. Since time on the headset 210 and on the PC 110 is not synchronized and network latency is varying and unpredictable, there is no way to coordinate the moment when the head pose is obtained on the headset 210 with the moment when it is being used for rendering on the PC 110.

Figure 6:
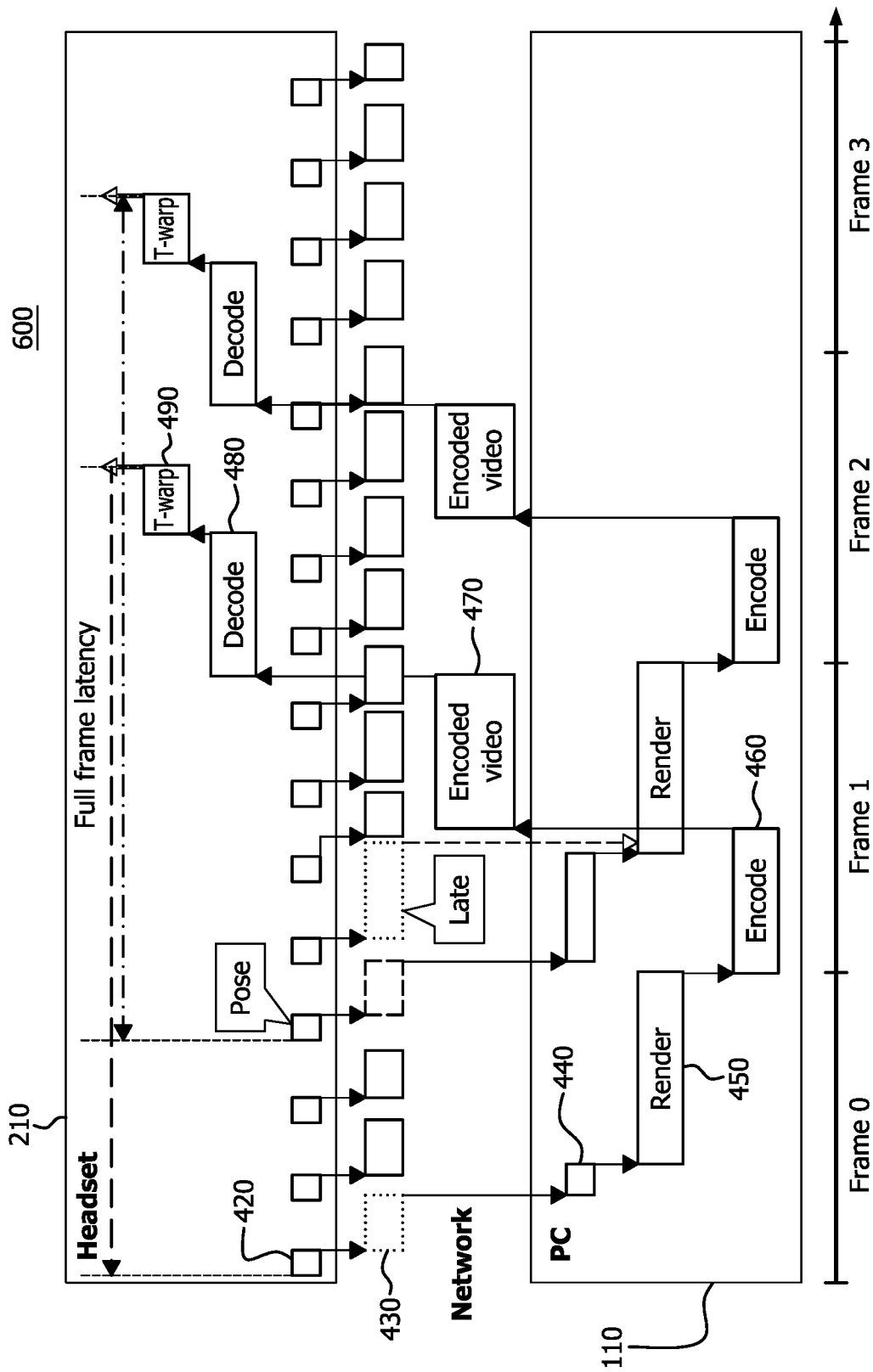
FIG. 6 is an example signaling diagram between a headset and a PC showing an example latency reduction in the pose queue.

In order to address the latency problem, head poses may be captured more frequently. FIG. 6 is an example signaling diagram 600 between the headset 210 and PC 110 showing an example latency reduction in the pose queue. As can be seen in FIG. 6, a head pose 420 is captured in Frame 0 and transmitted (430) to the PC 110. The PC 110 renders the image (450) and encodes the image (460) for transmission back to the headset 210 for display (470). The frequency of additional head pose captures is increased for each frame as shown. Accordingly, the most recent received head pose 420 by the PC 110 is used for rendering. For example, in Frame 1, it can be seen that although a head pose is captured and transmitted ostensibly in time for rendering, it arrives too late for rendering by the PC 110 (due to network latency or the like). Therefore, the PC 110 uses the previous head pose (labeled "pose") instead of the "late" head pose for rendering. Since the delay in receiving a head pose results in the previous (older) pose being used for rendering, it can cause image judder in situations where asynchronous time warp cannot hide it. Querying and transmitting the head pose more frequently than once per frame results in smaller pose errors.

Latency issues may also be reduced by using pose prediction. Pose prediction can be performed on either the headset 210 or the PC 100. If the pose prediction is performed on the headset 210, the most up-to-date data could be utilized from multiple sensors, such as accelerometers, gyros, magnetic field sensors, and the like on the headset 210 that can be used for pose prediction without having to be transmitted to the PC 110. The prediction interval can be calculated adaptively as a function of a statistic of measured round-trip latency (i.e., pose-to-frame).

Figure 7:
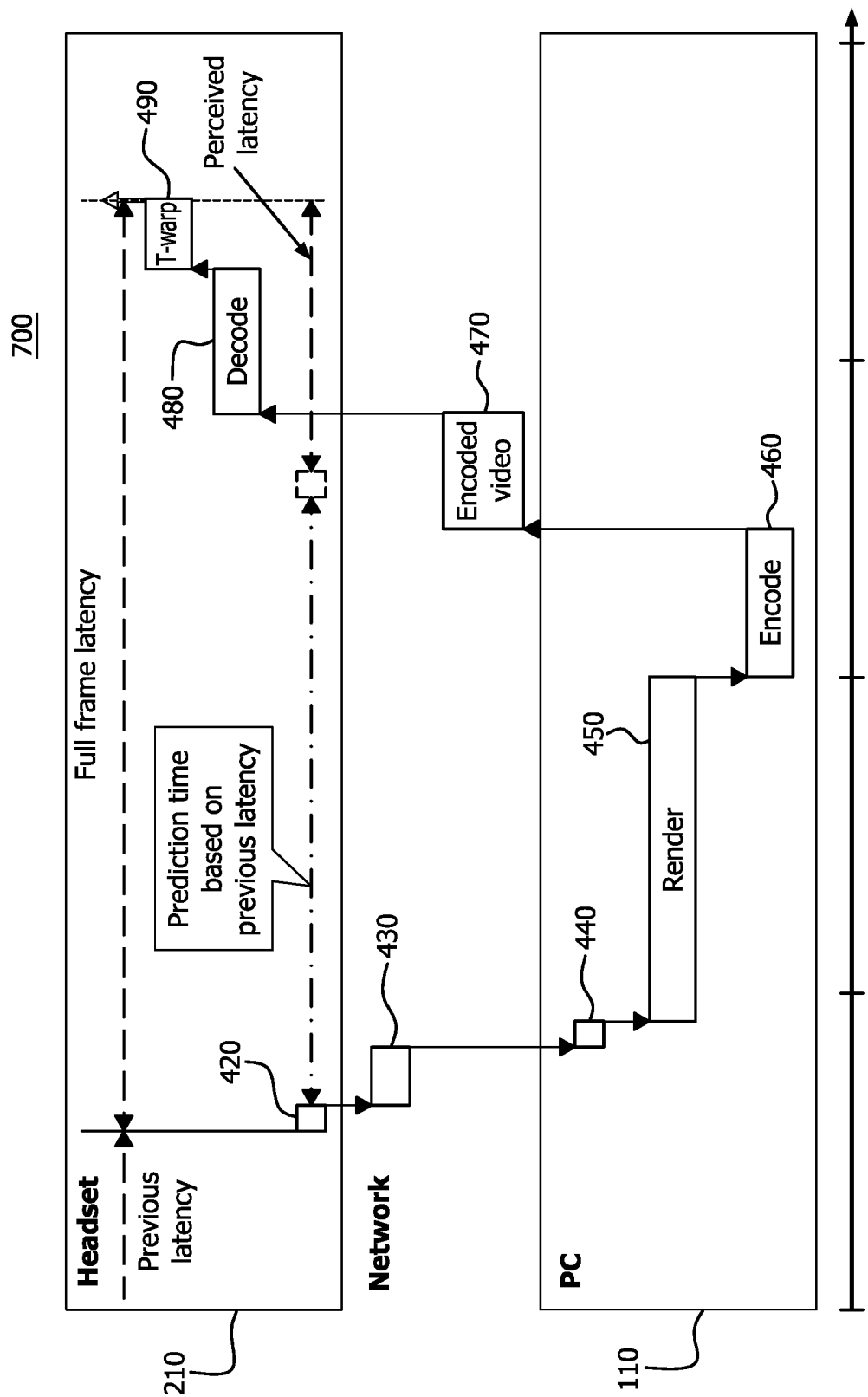
FIG. 7 is an example signaling diagram between a headset and a PC showing pose prediction.

FIG. 7 is an example signaling diagram 700 between the headset 210 and the PC 110 showing pose prediction. By utilizing the prediction time based on a previous latency, the headset 210 can then predict an estimated head pose for a future moment by extrapolating the current head pose.

Figure 8:
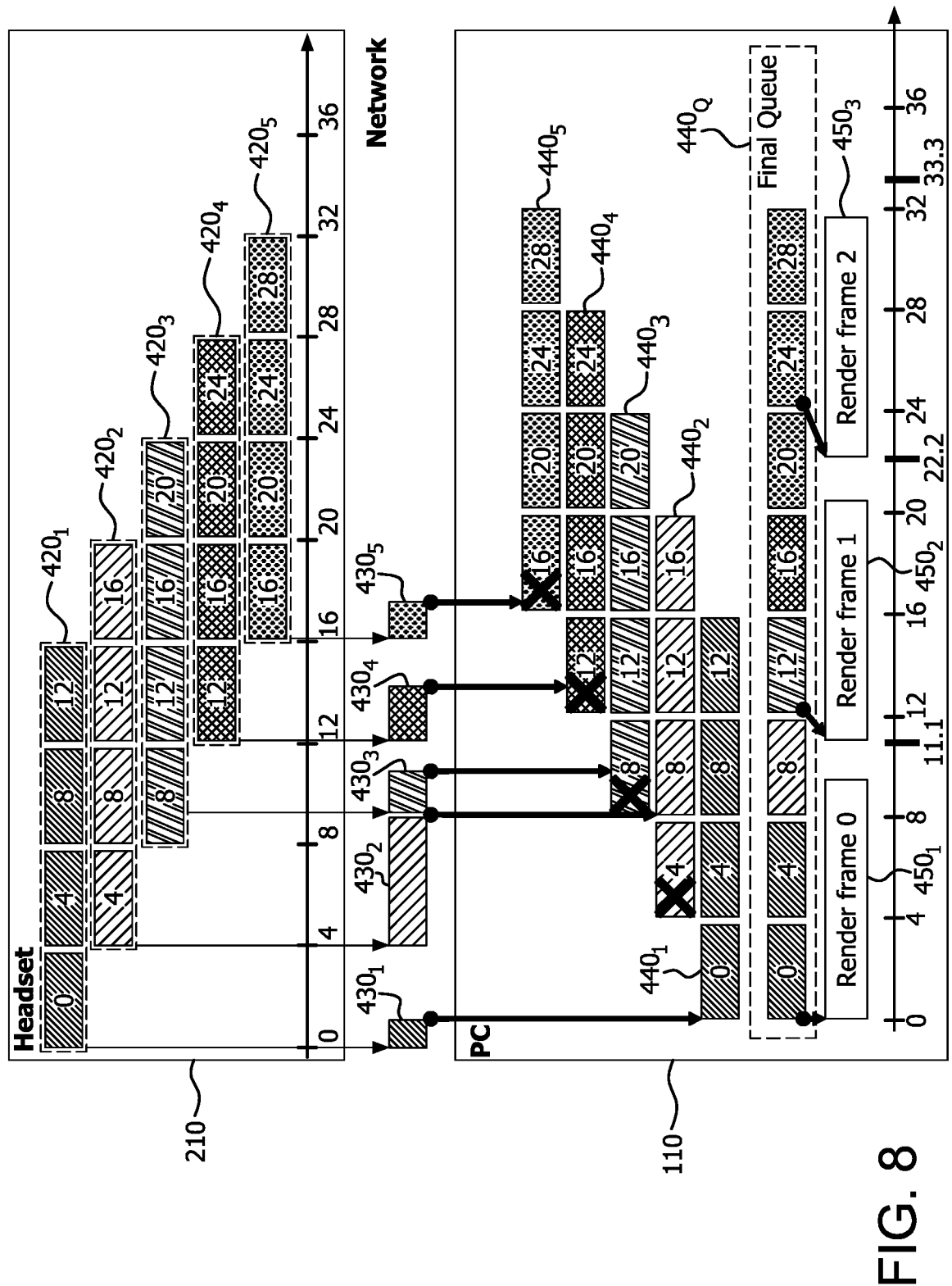
FIG. 8 is an example signaling diagram between a headset and a PC showing additional detail regarding pose prediction with respect to FIG. 7.

FIG. 8 is an example signaling diagram 800 between the headset 210 and the PC 110 showing additional detail regarding pose prediction with respect to FIG. 7. Although further detail is described below, the signaling diagram 800 includes a plurality of pose batches (designated $420_1$, $420_2$, $420_3$, $420_4$ and $420_5$) which are transmitted as $430_1$, $430_2$, $430_3$, $430_4$ and $430_5$. The batches are received by the PC 110 as $440_1$, $440_2$, $440_3$, $440_4$ and $440_5$ and will be stored in the final queue $440_Q$ after rendering ($450_1$, $450_2$, and $450_3$).

By sending multiple predicted poses in a single message, image judder that is caused by variable network transmission time can be reduced. For example, if poses are captured at 4 ms intervals, the headset 210 reads its current pose and extrapolates it to 4, 8, 12 millisecond (ms) intervals (and further out), while adding the constant expected transmission latency and sends the poses all together in a single message. The number of poses in a single batch may be variable and depend on the number of factors, such as the maximum transport unit (MTU) size of the underlying network transport, prediction accuracy, the time of the next pose query, or the like.

As shown in FIG. 8, a first batch of head poses ($420_1$) is captured and transmitted ($430_1$) to the PC 110 by the headset 210. The batch $420_1$ includes head poses captured at 0, 4, 8, and 12 ms intervals. The received head poses $440_1$ are received by the PC 110 and the render $450_1$ renders frame 0. That is, the PC 110 renders after receiving the first batch of poses $420_1$, records the message arrival time and uses the first 0ms pose for rendering the first frame. The remaining poses from the first batch are placed into a queue.

The next pose $420_2$ is captured 4 ms later, extrapolated to the same intervals of 4, 8, 12 ms and so on, resulting in poses for 4, 8, 12 and 16 ms respectively and transmitted by the headset 210 to the PC 110 ($430_2$). As shown in FIG. 8, the second batch of poses arrives 8 ms after the first batch (e.g., due to some temporary congestion on the network) which delays it by an additional 4 ms. The poses from the more recent batch ($420_2$) replace the corresponding poses from the former batch (4200 as they arrive, since prediction for a shorter time interval is more accurate. The pose queue now contains the 4, 8, 12 and 16 ms poses. Poses with the timestamps in the past are discarded. All poses from the beginning of the queue up to and including the pose that has been used to render a frame are removed from the queue.

The next frame to be rendered uses the pose from the queue with the timestamp closest to the timestamp of the frame itself. For example, when the frame rate is 90 fps (11.1 ms per frame), the second frame (i.e., frame 1) is rendered with the 12 ms pose, the third frame rendered with the 24 ms pose and so on. This is a result of the render for frame 1 ($450_2$) beginning after the reception of batch $420_3$.

Although increasing the frequency of head pose captures and transmissions reduces latency, it also presents another potential problem when used in a wireless system. Most wireless networks operate in half-duplex mode since both sides of a transmitting pair transmit data using the same frequency. The PC 110 sends large chunks of data containing compressed video and audio to the headset 210 at the same time when the headset is sending pose data in the opposite direction. Since these two streams are sent independently of each other, messages could collide and require retransmission some time later. Such collisions increase overall system latency. Increasing the number of messages travelling in either direction further increases the probability of a collision, therefore increasing the overall average latency potentially.

Figure 9:
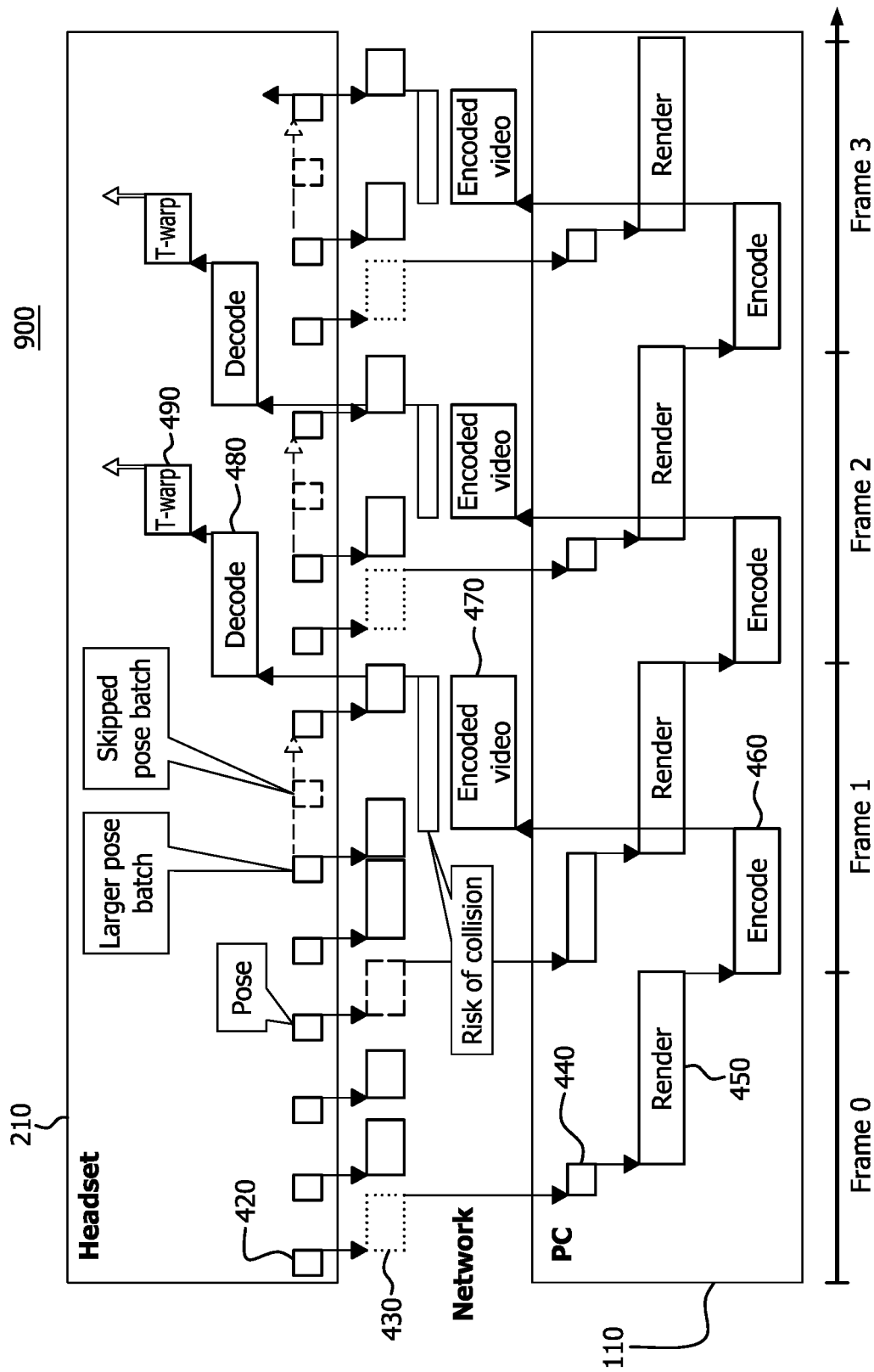
FIG. 9 is an example signaling diagram between a headset and a PC showing a collision reduction technique.

FIG. 9 is an example signaling diagram 900 between the headset 210 and the PC 110 showing a collision reduction technique. As shown in FIG. 9, where a larger pose batch is to be transmitted, a risk of collision occurs during the receiving of the encoded video (470). Accordingly, a pose batch might not arrive in time.

Figure 10:
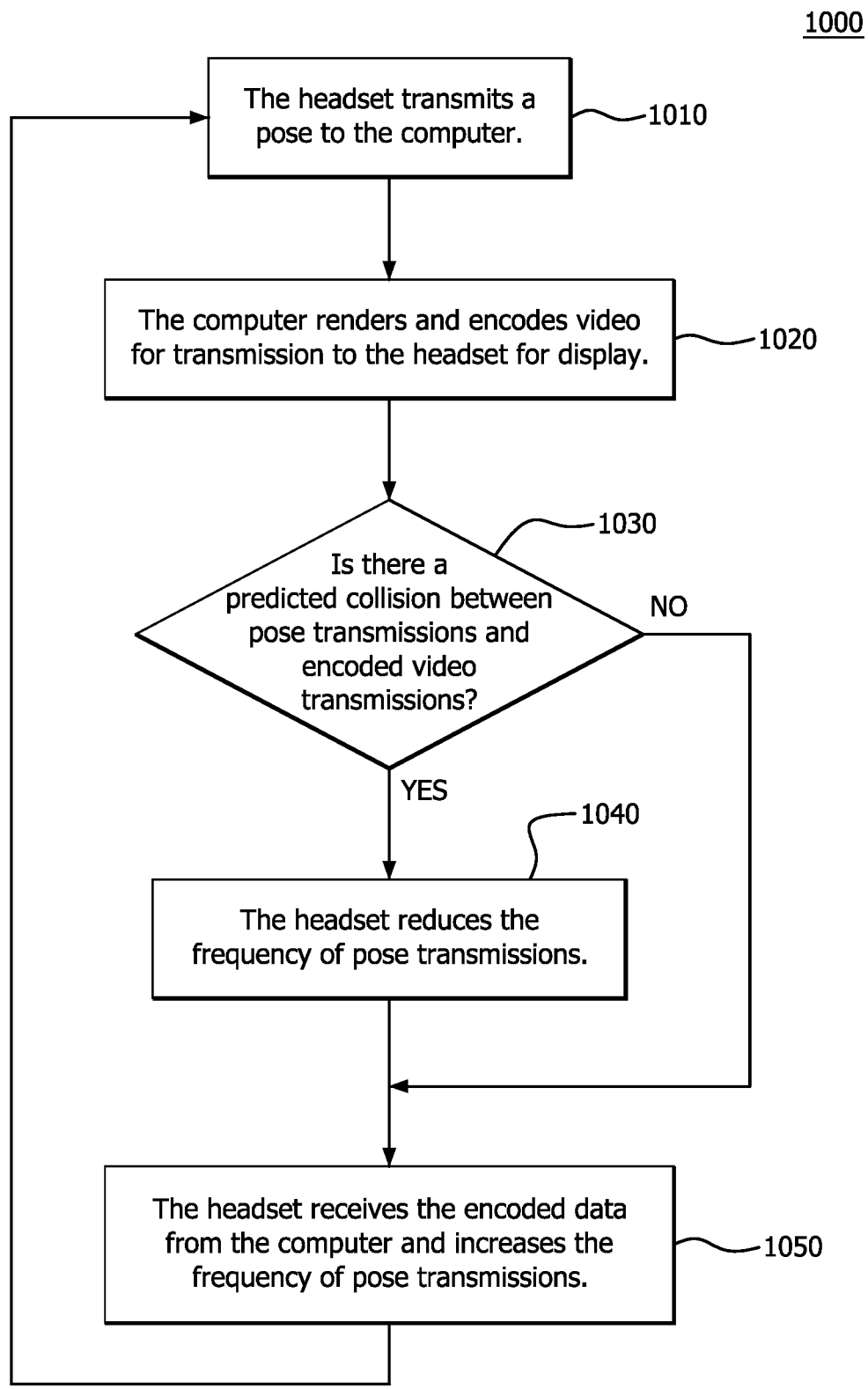
FIG. 10 is a flow diagram of an example method of reducing collisions.

FIG. 10 is a flow diagram of an example method 1000 of reducing collisions. The VR headset 210 transmits a pose (or pose batch) to the computer (e.g., PC 110) in step 1010. The computer renders and encodes the video for transmission to the headset 210 (step 1020). In step 1030, it is predicted whether a collision between the pose transmissions and the receiving of the encoded video transmissions may occur. If a collision is likely to occur, the headset reduces the frequency of the pose transmissions (step 1040). If not, the headset receives the encoded data from the computer and increases the frequency of the pose transmissions (step 1050). That is, if no collisions are expected, poses are transmitted at the maximum frequency for transmission. When collisions are likely, the frequency of sending poses is reduced. Once the danger of collisions passes, the frequency is increased back to its maximum value.

The lowest latency may be achieved by adaptively adjusting the frequency of sending the predicted poses based on measured latency. For example, the factors utilized to determine an optimal frequency are the rendering and encoding time on the PC, video and audio data transmission time, and a determination of other traffic occurring on the network. Also, the frequency of sending head pose data may be reduced when video or audio data starts arriving at the headset 210 to reduce the chance of a collision and minimize transmission time. Once video or audio data has been received, the frequency of sending head poses can be increased.

Since video data is transmitted frame-by-frame, it is expected to arrive at relatively regular intervals, which can be anticipated. The headset can reduce the frequency of head pose data right before the anticipated video packet arrives, thus minimizing the chance of a collision. The depth of prediction and the number of predicted poses can be increased to fill the gaps caused by lowering the pose querying frequency so that the size of the combined message sent across the network does not exceed the MTU of the underlying network used for transmission. The same rationale can be applied to audio data as well since audio data packets can also be either encoded and transmitted at regular intervals or bundled together with video in the same message.

The methods provided can be implemented in a general purpose computer, a processor, or a processor core. Suitable processors include, by way of example, a general purpose processor, a purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). For example, the methods described above may be implemented in the processor 102 or on any other processor in the computer system 100.

What is claimed is:

1. A method for reducing latency in a virtual reality system including a plurality of devices, comprising:
   capturing and transmitting, by a first device, a first batch of data to a second device;
   rendering and encoding a second data based upon the first batch of data, by the second device;
   transmitting, by the second device, to the first device, the second data;
   in response to a first prediction of a collision between a transmission of a second batch of data from the first device and the transmission of the second data, adjusting, by the first device, a frequency of capturing and transmitting the second batch of data.

2. The method of claim 1, further comprising decreasing the frequency of transmitting the second batch of data in response to the first prediction.

3. The method of claim 2, further comprising increasing the frequency to a maximum transmitting frequency in response to a second prediction that a third batch of data from the first device will not collide with a third data from the second device.

4. The method of claim 2, further comprising increasing the frequency to a maximum transmitting frequency upon receipt of the second data.

5. The method of claim 1, further comprising the first device transmitting the second batch of data at a maximum frequency in response to a third prediction that the second batch of data will not collide with the second data.

6. The method of claim 1 wherein the frequency is determined based upon an amount of time necessary to render and encode data on the second device.

7. The method of claim 1 wherein the frequency is determined based upon an amount of time to transmit video and audio data.

8. The method of claim 1 wherein the frequency is determined based upon a determination of other traffic occurring over a transmission network.

9. The method of claim 1, further comprising increasing the frequency upon receipt of the second data at the first device.

10. The method of claim 1 wherein the second data includes encoded image data, encoded video data, or a combination of encoded image data and encoded video data.

11. A system for reducing latency in a virtual reality system, comprising:
a wireless headset; and
a second device in wireless communication with the wireless headset,
the wireless headset configured to:
capture and transmit a first batch of data to the second device;
receive a second data from the second device based upon the first batch of data, rendered and encoded by the second device; and
in response to a first prediction of a collision between a transmission of a second batch of data from the wireless headset and the transmission of the second data by the second device, adjusting, by the wireless headset, a frequency of capturing and transmitting the second batch of data.

12. The system of claim 11, further comprising the wireless headset decreasing the frequency of transmitting the second batch of data in response to the first prediction.

13. The system of claim 12, further comprising the wireless headset increasing the frequency to a maximum transmitting frequency in response to a second prediction that a third batch of data will not collide with a third data from the second device.

14. The system of claim 12, further comprising the wireless headset increasing the frequency to a maximum transmitting frequency upon receipt of the second data.

15. The system of claim 12, further comprising the wireless headset transmitting the second batch of data at a maximum frequency in response to a third prediction that the second batch of data will not collide with the second data.

16. The system of claim 12, wherein the frequency is determined based upon an amount of time necessary to render and encode data on the second device.

17. The system of claim 12, wherein the frequency is determined based upon an amount of time to transmit video and audio data.

18. The system of claim 12, wherein the frequency is determined based upon a determination of other traffic occurring over a transmission network.

19. The system of claim 12, further comprising the wireless headset increasing the frequency upon arrival of the second data at the wireless headset.

20. A non-transitory computer-readable medium for reducing latency in a virtual reality system including a plurality of devices, the non-transitory computer-readable medium having instructions recorded thereon, that when executed by a processor, cause the processor to perform operations including:
capturing and transmitting, by a first device, a first batch of data to a second device;
rendering and encoding a second data based upon the first batch of data, by the second device;
transmitting, by the second device, to the first device, the second data;
in response to a first prediction of a collision between a transmission of a second batch of data from the first device and the transmission of the second data, adjusting, by the first device, a frequency of capturing and transmitting the second batch of data.

* * * * *